United States Patent
Horman (10) Patent No.: US 9,424,114 B2
(45) Date of Patent: Aug. 23, 2016

(54) INPUT/OUTPUT (I/O) PROCESSING VIA A PAGE FAULT DOORBELL MECHANISM

(71) Applicant: Red Hat, Inc., Raleigh, NC (US)

(72) Inventor: Neil Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 107 days.

(21) Appl. No.: 14/276,376

(22) Filed: May 13, 2014

(65) Prior Publication Data
US 2015/0331812 A1   Nov. 19, 2015

(51) Int. Cl.
*G06F 12/00*   (2006.01)
*G06F 11/07*   (2006.01)
*G06F 12/14*   (2006.01)
*G06F 12/02*   (2006.01)
*G06F 12/06*   (2006.01)
*G06F 12/08*   (2016.01)

(52) U.S. Cl.
CPC .............. *G06F 11/07* (2013.01); *G06F 11/073* (2013.01); *G06F 11/079* (2013.01); *G06F 12/023* (2013.01); *G06F 12/0253* (2013.01); *G06F 12/063* (2013.01); *G06F 12/08* (2013.01); *G06F 12/14* (2013.01); *G06F 12/1416* (2013.01); *G06F 12/1441* (2013.01); *G06F 12/1483* (2013.01); *G06F 2212/1052* (2013.01)

(58) Field of Classification Search
CPC . G06F 12/023; G06F 12/0253; G06F 12/063; G06F 12/08; G06F 12/1416; G06F 12/1441
See application file for complete search history.

(56) References Cited

U.S. PATENT DOCUMENTS

2013/0132690 A1*   5/2013   Epstein ................. G06F 12/145
                                                                711/159

* cited by examiner

*Primary Examiner* — Shawn X Gu
(74) *Attorney, Agent, or Firm* — Hayes and Boone, LLP (57) ABSTRACT

Systems and methods are disclosed for processing an input/output (I/O) operation. An example system includes a kernel interface that receives a notification of a page fault. The page fault is responsive to an application attempting to perform an operation on a memory region that is set to a first access mode. When the memory region is set to the first access mode, the application does not have permission to perform the operation on the memory region. The system also includes a handler that responsive to the notification (i) sets the memory region to a second access mode and (ii) spawns a kernel thread to drain data from the memory region. When the memory region is set to the second access mode, the application has permission to perform the operation on the memory region. The system further includes an I/O module that stores the data in the memory region for processing.

20 Claims, 4 Drawing Sheets

INPUT/OUTPUT (I/O) PROCESSING VIA A PAGE FAULT DOORBELL MECHANISM

BACKGROUND

The present disclosure generally relates to computing devices, and more particularly to processing an input/output (I/O) request from an application.

An operating system (OS) kernel serves as an intermediary layer between the hardware and software (e.g., an application). The kernel passes application requests to the hardware and acts as a low-level driver to address the hardware devices and components of the system. The kernel may be viewed as a comprehensive library of functions that can be invoked by an application. A system call is an interface between the application and library. By invoking a system call, an application can request a service that the kernel then fulfills.

For example, in networking, an application may send data though the kernel for transmission over a network. In a conventional system, the application marshals packets of data and invokes a system call into the kernel. A system call may slow down the system because the application stops executing and control of the central processing unit (CPU) is transferred to the kernel, which then copies the data to be transmitted over the network into a private memory space (e.g., kernel memory buffer) and queues the data for transmission. After the kernel sends the applicable data over the network, the kernel returns execution control to the application. When the application desires to send more data over the network at a later point in time, the application again marshals packets of data and invokes the system call into the kernel.

While the use of the system call is safe and secure, the use of the system call is also inefficient because it causes the CPU to encounter a trap, which is a slow process whereby execution of the next natural execution of the CPU data flow is halted and moved to another location.

BRIEF SUMMARY

This disclosure relates to processing I/O operations. Methods, systems, and techniques for processing an I/O request from an application are provided.

According to an embodiment, a method of processing an input/output (I/O) operation includes receiving a notification of a page fault. The page fault is responsive to an application attempting to perform an operation on a memory region that is set to a first access mode, and the memory region is designated to the application. When the memory region is set to the first access mode, the application does not have permission to perform the operation on the memory region. The method also includes responsive to the notification, setting the memory region to a second access mode. When the memory region is set to the second access mode, the application has permission to perform the operation on the memory region. The method further includes responsive to receiving the notification, spawning a kernel thread to drain data from the memory region. The method also includes storing the data in the memory region. A hardware device processes the data.

According to another embodiment, a system for an I/O operation includes a kernel interface that receives a notification of a page fault. The page fault is responsive to an application attempting to perform an operation on a memory region that is set to a first access mode, and the memory region is designated to the application. When the memory region is set to the first access mode, the application does not have permission to perform the operation on the memory region. The system also includes a handler that responsive to the notification (i) sets the memory region to a second access mode and (ii) spawns a kernel thread to drain data from the memory region. When the memory region is set to the second access mode, the application has permission to perform the operation on the memory region. The system further includes an I/O module that stores the data in the memory region. A hardware device processes the data.

According to another embodiment, a non-transitory machine-readable medium includes a plurality of machine-readable instructions that when executed by one or more processors are adapted to cause the one or more processors to perform a method including: receiving a notification of a page fault, the page fault being responsive to an application attempting to perform an operation on a memory region that is set to a first access mode, and the memory region being designated to the application, where when the memory region is set to the first access mode, the application does not have permission to perform the operation on the memory region; responsive to receiving the notification: (i) setting the memory region to a second access mode and (ii) spawning a kernel thread to drain data from the memory region, where when the memory region is set to the second access mode, the application has permission to perform the operation on the memory region; and storing the data in the memory region, where a hardware device processes the data.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
   A. User Space and Kernel Space
   B. Kernel as an Intermediary
   C. Memory Map a Region of Memory
   D. Accelerate I/O Operations
      1. Page Fault as a Doorbell Mechanism
      2. Change Access Permission of Shared Memory Region 3. Spawn an Independent Kernel Thread to Drain the Shared Memory Region III. Example Process Flow of a Write to a Write-Protected Shared Memory Region IV. Example Method V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to accelerate the processing of I/O requests from an application. In an embodiment, a system for processing an input/output (I/O) operation includes a kernel interface that receives a notification of a page fault. The page fault is responsive to an application attempting to perform an operation on a memory region that is set to a first access mode, and the memory region is designated to the application. When the memory region is set to the first access mode, the application does not have permission to perform the operation on the memory region. The system also includes a handler that responsive to the notification (i) sets the memory region to a second access mode and (ii) spawns a kernel thread to drain data from the memory region. When the memory region is set to the second access mode, the application has permission to perform the operation on the memory region. The system further includes an I/O module that places the data in the memory region, where a hardware device processes the data.

II. Example System Architecture

Figure 1:
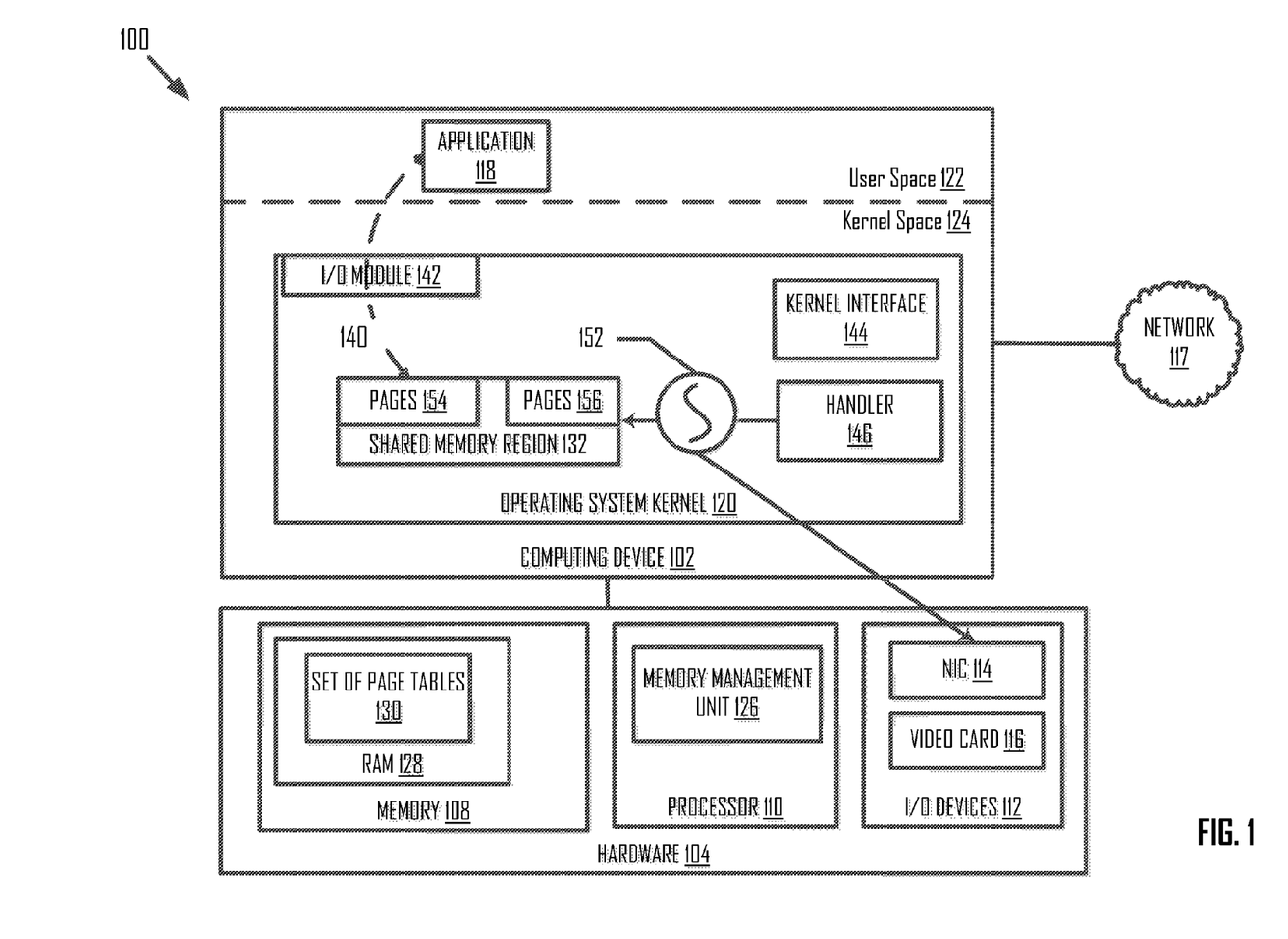
FIG. 1 is a block diagram illustrating a system for processing an input/output (I/O) request from an application, according to an embodiment.

FIG. 1 is a simplified block diagram 100 illustrating a system for processing an input/output (I/O) request from an application, according to an embodiment. Diagram 100 includes a computing device 102 coupled to hardware 104. Hardware 104 includes a memory 108, a processor 110, and I/O devices 112. I/O devices 112 include a network interface card (NIC) 114 and a video card 116. Hardware 104 may also include other hardware devices or different hardware devices than that shown in FIG. 1.

Computing device 102 may be coupled over a network 117 (e.g., via NIC 114). Network 117 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Computing device 102 may execute an application 118 that uses resources of computing device 102. Application 118 may have several processes executing on computing device 102. Although one application is illustrated in FIG. 1, it should be understood that computing device 102 may execute more than one application. Computing device 102 may also execute an operating system (OS) kernel 120 that serves as an intermediary between hardware 104 and software (e.g., application 118).

A. User Space and Kernel Space

The system memory of computing device 102 may be divided into two distinct regions: a user space 122 and a kernel space 124. Application 118 may execute in user space 122, which includes a set of memory locations in which user processes run. A process is an executing instance of a program. Kernel 120 may execute in a kernel space 124, which includes a set of memory locations in which kernel 120 executes and provides its services. The kernel lives in a different portion of the virtual address space from the user space.

Kernel space 124 may be accessed by application 118 through the use of system calls. To interact with the hardware device, application 118 may invoke a system call into kernel 120. For example, application 118 may send an I/O request to kernel 120 via a system call to request that a particular hardware device perform a particular action. A system call may refer to a request by an active process for a service performed by kernel 120. An example request may be an I/O or process creation request. An active process is a process that is currently processing in processor 110, as contrasted with a process that is waiting for its next turn in processor 110. I/O may be any program, operation, or device that transfers data to or from processor 110 and to or from a hardware device (e.g., disk drives, keyboards, mice, and printers). The invocation of the system call requires effort on the part of the processor 110 because a switch between the user mode and kernel mode of processor 110 is performed.

B. Kernel as an Intermediary

Application 118 may send an I/O request for a hardware device to perform an operation by invoking a system call. Kernel 120 may receive the application's request and pass it to the appropriate hardware device for processing (e.g., to perform the requested operation). Kernel 120 abstracts components of hardware 204 on a high level such that application 118 may send a request that is processed by a hardware device without knowing the fine details of the hardware device. Kernel 120 includes one or more device drivers that communicate with hardware devices coupled to computing device 102 (not shown). A device driver supports application communication to enable data to be read from and written to a device.

Additionally, kernel 120 may manage resources of computing device 102 when one or more applications are running on computing device 102. In an example, kernel 120 may share available resources (e.g., CPU time, disk space, and network connections) between various system processes while at the same time ensuring system integrity. In an example, kernel 120 is a LINUX® kernel. Trademarks are the property of their respective owners.

Kernel 120 may use a memory management technique called virtual memory, which maps virtual addresses used by an application into physical addresses in memory 108. In a virtual memory system, the addresses seen by user programs do not directly correspond to the physical addresses used by the hardware. Processor 110 includes a memory management unit (MMU) 126 that supports the use of virtual memory. With MMU 126, memory addresses may go through a translation step from a virtual address to a physical address prior to each memory access. Memory 108 may include random access memory (RAM) 128, and MMU 126 may divide RAM 128 into pages. A page is a contiguous section of memory of a set size that is handled by MMU 126 as a single entity.

Each application has its own address space that is segregated from all other applications. Kernel 120 maintains data structures that map the virtual memory of each application into the physical memory of the computer. The data structures may be page tables that establish an association between the virtual addresses of a user process and the physical memory of the system. For example, RAM 128 includes a set of page tables 130 that may be application 118's page tables. Set of page tables 130 may have direct virtual address to physical address translations for the virtual addresses used by application 118. For each application executing in computing device 102, kernel 120 may create a set of page tables to map virtual addresses assigned to the respective application to physical address in memory 108. Additionally, kernel 120 may maintain separate pages tables for each application. Although set of page tables 130 is illustrated as being resident in RAM 128, it should also be understood that portions (e.g., pages) of set of page tables 130 may not be resident in RAM 128 and may be swapped in and out of RAM 128.

C. Memory Map a Region of Memory

A region of memory may be mapped directly into a user process's virtual address space. Mapping a memory region may refer to associating a range of user-space addresses with an I/O device that is associated with the memory region. When application 118 reads from or writes to the assigned address range, application 118 is accessing the I/O device. In an example, application 118 sends a memory map request to map an I/O data source's memory to a set of virtual addresses assigned to application 118. Kernel 120 may receive the memory map request and fulfill it using set of page tables 130 to store the mapping. In an example, kernel 120 provides a system call (e.g., mmap or mmap2) that enables application 118 to create one or more memory mappings. In such an example, application 118 may send the memory map request via invocation of the system call.

For brevity and simplicity, the following may describe a memory region that is associated with NIC 114 and that is mapped to application 118's virtual address space, but it should be understood that this description applies as well to other hardware devices and/or other applications that may execute in computing device 102. For example, the memory region may be associated with another hardware device (e.g., video card 116, serial port, or printer) that processes an I/O request from application 118.

Application 118 may send a request for a memory region that is associated with NIC 114 and that is mapped into application 118's virtual address space. The memory region may be used to process I/O operations (e.g., sending and receiving data over a network). The request may include a descriptor and a memory size. The descriptor may be an I/O data source (e.g., socket or file), and the memory size may be an amount of memory space that application 118 wishes to have memory mapped. Kernel 120 may create set of page tables 130 in accordance with the request.

Application 118 may specify a fixed address for the mapping, suggest an address, or leave the choice of address to kernel 120. In an example, the memory map request (e.g., parameters of the system call) includes memory locations that specify the particular memory locations that application 118 wants memory mapped. In another example, the request does not include the particular memory locations that application 118 wants memory mapped and kernel 120 selects the memory locations for the memory mapping.

Kernel 120 includes a shared memory region 132 that kernel 120 may map into application 118's virtual address space. If kernel 120 designates shared memory region 132 to application 118, shared memory region 132 may be accessible to both kernel 120 and application 118. Accordingly, shared memory region 132 is a portion of kernel 120's memory region that may be shared between application 118 and kernel 120. In an example, application 118 invokes a memory map system call that requests a memory region for I/O operations performed by NIC 114 (e.g., sending and receiving data over a network) and kernel 120 identifies shared memory region 132 as the memory region to map into application 118's virtual address space and to associate with NIC 114. In such an example, shared memory region 132 is a network buffer, and application 118 may send a request for a region of memory that is dedicated to network operations. The request may include a descriptor (e.g., socket buffer) and a memory size. Set of page tables 130 includes a mapping of the descriptor to NIC 114 and also includes application 118's access permissions to shared memory region 132.

The memory map system call traps into kernel 120, which takes over execution of processor 110 and recognizes the invocation of the system call as a memory map request. Kernel 120 may identify shared memory region 132 and use it for data that is sent to or from a particular hardware device. Shared memory region 132 includes one or more pages of memory. As illustrated in FIG. 1, shared memory region 132 includes pages 154 and 156.

In keeping with the example in which the hardware device is NIC 114, data that is transmitted from a remote computing device to NIC 114 (e.g., over network 117 from another computing device) or that is transmitted from application 118 to NIC 114 (e.g., to be sent to a remote computing device over network 117) is processed using shared memory region 132. In such an example, shared memory region 132 may be a memory buffer that stores data to be sent to a hardware device (e.g., NIC 114). In an example, if application 118 wishes to transmit data over the network, application 118 may invoke a system call (e.g., a "send" system call for a LINUX® kernel) that writes data to one or more pages (e.g., pages 154 and 156) of shared memory region 132. In such an example, application 118 may write data directly to shared memory region 132 via a system call. Kernel 120 may transmit the data from shared memory region 132 to NIC 114, which may then transmit the data over the network. Similarly, if NIC 114 receives data from over network 117 and the data is meant for application 118, NIC 114 may write the data to shared memory region 132, which is associated with application 118. Kernel 120 may transmit the data from shared memory region 132 to application 118 for processing.

Kernel 120 sets up application 118's set of page tables 130 to process the memory map request. Kernel 120 may store an association between application 118's virtual address space and shared memory region 132 into set of page tables 130. Set of page tables 130 may also include application 118's access permissions to shared memory region 132. Kernel 120 may use a protected mode of operation to protect various pages of shared memory region 132 in regard to its associated application (e.g., application 118). In an example, set of page tables 130 includes a bit mask with shared memory region 132's read, write, and execute permissions. In such an example, the bit mask field may describe what application 118 is allowed to do with pages belonging to shared memory region 132.

Kernel 120 may set bits in set of page tables 130 based on application 118's access permissions to shared memory region 132. When application 118 attempts to access a virtual address, kernel 120 uses set of pages tables 130 to perform an initial page table translation from the virtual address to the physical address and determines whether application 118 has permission to access that memory address. Accordingly, when application 118 attempts to perform an operation on shared memory region 132, kernel 120 is notified.

Examples of access permissions are read-only, write-only, read-execute only, read-write only, and read-write-execute only. If application 118 has read-only access permission to shared memory region 132, application 118 can only read the data stored at shared memory region 132. In such a scenario, application 118 is unable to write to shared memory region 132. If application 118 has write-only access permission to shared memory region 132, application 118 can only write data to shared memory region 132. In such a scenario, application 118 is unable to read from shared memory region 132. If application 118 has read-write access permission to shared memory region 132, application 118 can read the data stored at shared memory region 132 and write data to shared memory region 132.

D. Accelerate I/O Operations

1. Page Fault as a Doorbell Mechanism

Kernel 120 includes an I/O module 142, kernel interface 144, and handler 146. In an example, application 118 may send data via NIC 114 over network 117 by invoking a system call (e.g., a "send" system call for a LINUX® kernel) to send the data over network 117. I/O module 142 may receive the data to be sent over the network via the system call and store the data in shared memory region 132, as indicated by an arrow 140. Accordingly, application 118 may write the data to shared memory region 132 via I/O module 142. In an example, kernel 120 sends the data stored in shared memory region 132 to NIC 114. In another example, NIC 114 retrieves the data from shared memory region 132. After the first system call that application 118 invokes to send the data over network (e.g., the "send" system call), application 118 typically invokes another system call to drain the data from shared memory region 132. Draining data from shared memory region 132 may include post-processing of the data stored in shared memory region 132 (e.g., sending the data over network 117) and marking shared memory region 132 as available for reuse by application 118. The subsequent system call causes another trap into kernel 120 and execution flow transfers from application 118 to kernel 120, slowing down the application.

The present disclosure describes techniques to accelerate the processing of I/O operations. In an embodiment, the subsequent system call discussed above is unnecessary and only one system call (e.g., the "send system call) is invoked to complete the I/O operation and drain the data from shared memory region 132. To accelerate the processing of I/O operations, kernel 120 may desire to mark shared memory region 132 in such a way that kernel 120 receives a notification when application 118 attempts to access shared memory region 132. When kernel 120 receives the notification that application 118 is attempting to perform an operation on the memory region that is marked as an accelerated region, kernel 120 may perform actions to accelerate processing of the I/O operation.

In computing systems, a page fault may notify the kernel of actions that are being performed by an application or being attempted by the application. For example, if application 118 requests an address on a page that is not in the current set of memory pages resident in RAM 128, a page fault may occur. In an embodiment, kernel 120 uses a page fault as a doorbell mechanism to determine when to perform actions that accelerate an I/O operation. In an example, kernel 120 marks shared memory region 132 as an "accelerated region" and sets shared memory region 132 to a first access mode. When shared memory region 132 is set to the first access mode, application 118 does not have permission to perform the operation on the memory region. Accordingly, when application 118 attempts to access shared memory region 132, which is set to the first access mode, kernel interface 144 may receive a notification of a page fault. The page fault is responsive to application 118 attempting to perform the operation on shared memory region 132. In such an example, application 118 is attempting to perform an operation that is in conflict with the permission bits encoded in set of page tables 130.

The page fault is a trap into kernel 120, resulting in processor 110 halting execution of application 118 and kernel 120 taking over control of processor 110. Handler 146 may handle the page fault. For example, responsive to the page fault handler 146 may determine whether to halt execution of application 118, crash application 118, or change the access permission of shared memory region 132 from the first access mode to a second access mode. When the memory region is set to the second access mode, application 116 has permission to perform the operation on the memory region and may continue to execute.

If shared memory region 132 is marked as an accelerated region, handler 146 may perform actions to accelerate the processing of I/O operations. In keeping with the above example in which shared memory region 132 is marked as an accelerated region, responsive to the notification of the page fault handler 146 may set shared memory region 132 to a second access mode, spawn a kernel thread 152 to drain data from shared memory region 132, and return control of processor 110 to application 118 to continue to perform work. I/O module 142 may store the data in shared memory region 132, and kernel thread 152 may send the data stored in shared memory region 132 to the hardware device associated with shared memory region 132 for processing.

2. Change Access Permission of Shared Memory Region

The page fault may be the mechanism by which pages of shared memory region 132 are set to the second access mode. Kernel 120 may change the access permission of shared memory region 132 from the first access mode to a second access mode by modifying the permission bits encoded in set of page tables 130, thus preventing further page faults from occurring (until shared memory region 132 is reset to the first access mode). When shared memory region 132 is set to the second access mode, I/O module 142 may store the data in shared memory region 132 for processing by the hardware device that is associated with the shared memory region 132. In an example, when application 118 attempts to perform the operation on pages 154 of shared memory region 132 when it is set to the first mode, a page fault may occur. After handler 146 sets shared memory region 132 to the second access mode, if application 118 attempts to perform the operation on pages 156 of shared memory region 132, a page fault does not occur.

When I/O module 142 stores data in shared memory region 132, kernel 120 may mark shared memory region 132 as unavailable. In an example, I/O module 142 stores the data at pages 154 of shared memory region 132 and marks these pages as unavailable. In such an example, the remaining pages of shared memory region 132 may be marked as available. For example, pages 156 of shared memory region 132 may be marked or remain marked as available.

In an example, the operation is a write operation, the first access mode is a read-only mode, and application 118 only has permission to read shared memory region 132. In such an example, when application 118 attempts to write to shared memory region 132, a page fault occurs and traps into kernel 120. To allow application 118 to write data to shared memory region 132, handler 146 may set shared memory region 132 to a mode that gives application 118 permission to write to shared memory region 132. For example, handler 146 may set shared memory region 132 to a read-write only mode, write-only mode, write-execute only mode, or a write mode. In an example, handler 146 enables the write bit in set of pages tables 130. A write mode may include any particular access permissions that enable application 118 to write to shared memory region 132 without causing a page fault because application 118's access permissions are in conflict with set of page tables 130.

Although the first access mode may be described as being in a read-only mode, this is not intended to be limiting. For example, if the operation is a write operation, the first access mode may be in any mode that is in conflict with application 118 writing to shared memory region 132. The first access mode may be, for example, an execute-only mode, a read-execute only mode, etc. that does not give application 118 permission to write to shared memory region 132.

Additionally, although the operation that causes the page fault may be described as being a write operation, this is not intended to be limiting. Rather, the operation may be any operation that enables a page fault to occur to inform kernel 120 that application 118 is attempting to access shared memory region 132. For example, the operation may be a read operation and the first access mode may be a write-only mode. When application 118 attempts to read from shared memory region 132, a page fault occurs. Responsive to the page fault, kernel 120 may change application 118's access permission to shared memory region 132 from write-only mode to read-write mode. Accordingly, application 118 may subsequently be able to write to shared memory region 132 without encountering a page fault.

3. Spawn an Independent Kernel Thread to Drain the Shared Memory Region

The present disclosure provides a mechanism whereby as soon as I/O module 142 stores the data in shared memory region 132, handler 146 can start an independent task to drain shared memory region 132. In an embodiment, kernel 120 spawns kernel thread 152 to drain data from shared memory region 132. Kernel thread 152 may be an independent thread that drains shared memory region 132 independent of execution of application 118. To drain data from shared memory region 132, kernel thread 152 may perform post-processing on the data stored in shared memory region 132 and send the data to the hardware device associated with shared memory region 132. Kernel thread 152 may place the data on a queue to be processed by the hardware device, which completes the I/O operation. Kernel thread 152 may drain the transmission queue independent of the directive of application 118. In the example in which the hardware device is NIC 114, kernel thread 152 may drain data from shared memory region 132 by processing the data via kernel 120's networking stack and sending the processed data to NIC 114 to transmit over network 117. In such an example, I/O module 142 may store in shared memory region 132 the data to be transmitted over network 117, and kernel thread 152 may pack the data to be transmitted into various protocol layers prior to dispatch, and request the services of NIC 114 to process the request and send the appropriate data over network 117.

Using the techniques provided in the present disclosure, it may be unnecessary for application 118 to invoke a system call to drain shared memory region 132 (e.g., buffer). Rather, based on the page fault notification, handler 146 may automatically spawn kernel thread 152 to drain shared memory region 132 and application 11 may continue to fill pages of shared memory region 132 while kernel thread 152 drains other pages of shared memory region 132. Accordingly, the use of shared memory region 132 may obviate the need for multiple traps into the operating system. Rather, application 118 may send a single system call (e.g., the "send system call) into kernel 120 in order to request that the hardware device perform the I/O operation (e.g., request for NIC 114 to send data over network 117) and kernel 120 may handle the rest of the I/O processing without a subsequent system call. In particular, application 118 may continue to fill pages of shared memory region 132 while kernel thread 152 drains other pages of shared memory region 132.

In an example, kernel thread 152 recognizes that pages 154 of shared memory region 132 store the data to be sent to the hardware device, creates a pointer to the stored data to be sent to the hardware device, and places the data on a queue to be processed by the hardware device. During a time period in which kernel thread 152 is draining pages 154 of shared memory region 132, application 118 may perform the operation again but on an available region of shared memory region 132 (e.g., pages 156) without encountering a page fault.

In keeping with the above example in which the operation is a write operation and I/O module 142 writes data to pages 154 of shared memory region 132, during a time period in which kernel thread 152 is draining pages 154 of shared memory region 132 (e.g., processing the data stored at pages 154 of shared memory region 132 and sending the data to NIC 114), application 118 may write other data to pages 156 of shared memory region 132 for transmission over network 117. Additionally, before the time period, kernel 120 may return control of execution to application 118. Accordingly, kernel thread 152 may drain data from pages 154 of shared memory region 132 in parallel with application 118 writing other data to pages 156 of shared memory region 132. If application 118 writes other data to shared memory region 132, kernel thread 152 may process that data as well. For example, if application 118 writes other data to pages 156 for transmission over network 117, kernel thread 152 may perform post-processing on the data stored at pages 156 of shared memory region 132 and send that data to the hardware device associated with shared memory region 132.

After processing the data stored at a set of pages (e.g., pages 154) of shared memory region 132, kernel thread 152 may send a communication to mark those pages as available to kernel 120. For example, after kernel thread 152 performs particular actions on data stored at pages 154 of shared memory region 132, kernel thread 152 may inform kernel 120 that pages 154 of shared memory region 132 may be marked as available and thus, free for reuse by application 118. I/O module 142 may receive the communication to mark particular pages of shared memory region 132 as available. Responsive to the communication to mark particular pages of shared memory region 132 as available, I/O module 142 may mark those pages of shared memory region 132 as available.

In an example, after kernel thread 152 sends the data stored at pages 154 of shared memory region 132 to its associated hardware device, kernel thread 152 informs kernel 120 that pages 154 of shared memory region 132 may be marked as available. In such an example, kernel thread 152 may send an interrupt indicating that the data has been sent to the hardware device. In another example, after the hardware device associated with shared memory region 132 performs the I/O operation, kernel thread 152 informs kernel 120 that pages 154 of shared memory region 132 may be marked as available. In such an example, kernel thread 152 may send an interrupt indicating that the hardware device has completed the requested I/O operation. The interrupt may inform kernel 120 that pages 154 of shared memory region 132 may be marked as available.

After the hardware device completes the I/O operation, kernel thread 152 may send a notification that the I/O operation has completed to kernel 120. In an example, if the hardware device has completed each of the I/O operations having data stored in shared memory region 132, kernel thread 152 may send the notification that the I/O operation has completed to kernel 120. I/O module 142 may receive the notification that the I/O operation has completed. Responsive to the notification that the I/O operation has completed, I/O module 142 may reset shared memory region 132 to the first access mode.

As discussed above, when shared memory region 132 is set to the first access mode, application 118 does not have permission to perform the particular operation that caused the original page fault discussed above (e.g., a write to shared memory region 132). Accordingly, when application 118 attempts to perform the operation on shared memory region 132 after it has been reset to the first access mode, a page fault occurs. In the example in which the operation is a write operation, subsequent writes by application 118 to shared memory region 132 after it has been reset to the first access mode are detectable via a page fault. Resetting shared memory region 132 to the first access mode may be advantageous in the event that the I/O operation completes and it is a long time before application 118 performs the operation again (e.g., a long time before other writes are made to shared memory region 132).

When the hardware device finishes processing the I/O operation, the buffer allocated for the I/O request from application 118 may be freed and the OS resources that were consumed by the buffer may be reused for other purposes. The availability of shared memory region 132 may become visible to application 118. Kernel 120 and application 118 may communicate such that application 118 is able to determine whether shared memory region 132 is available or unavailable.

III. Example Process Flow of a Write to a Write-Protected Shared Memory Region

Figure 2:
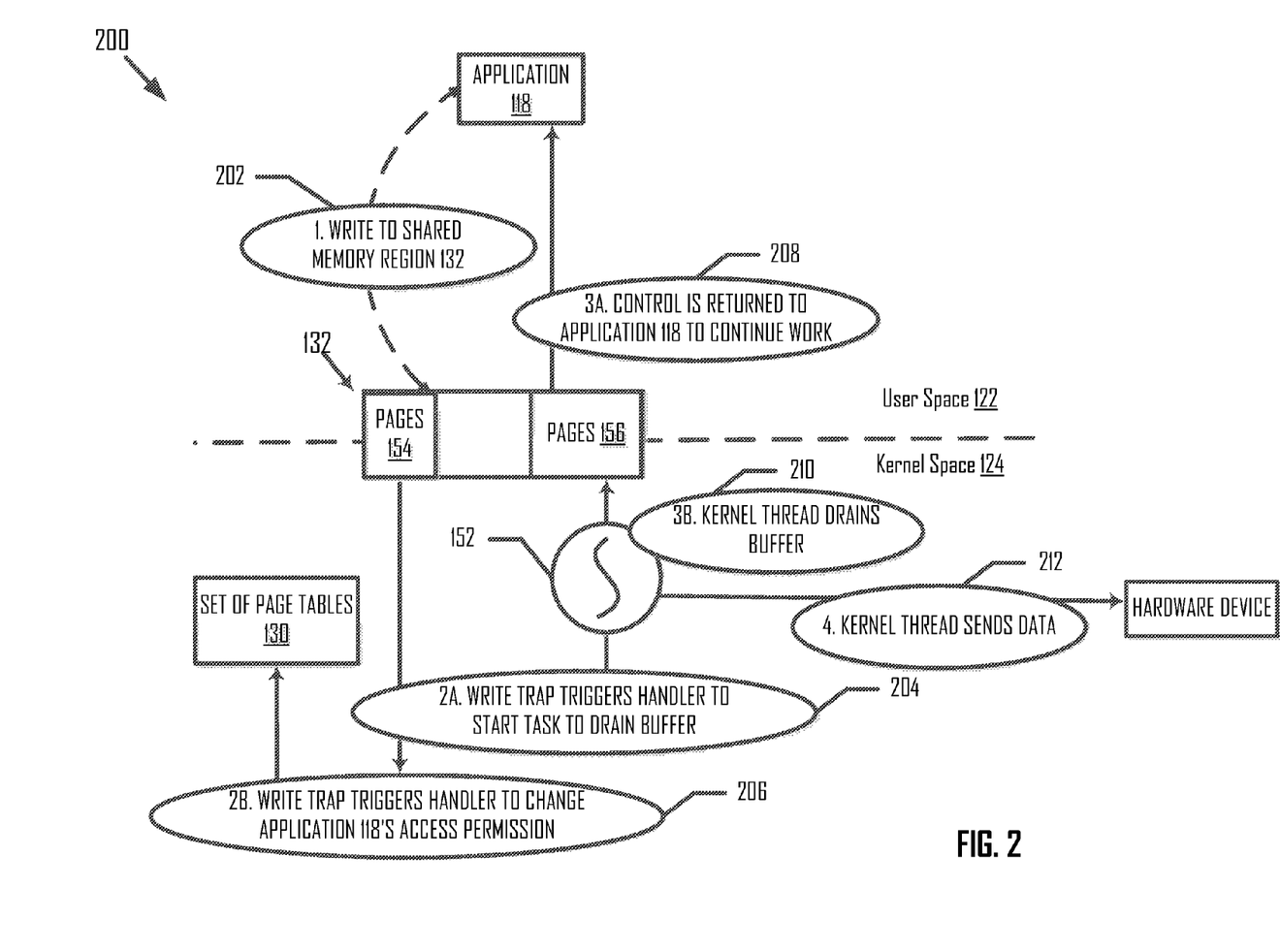
FIG. 2 is a block diagram illustrating a process flow for processing an I/O request from the application, according to an embodiment.

FIG. 2 is a simplified block diagram illustrating a process flow 200 for processing an I/O request from application 118, according to an embodiment. In an example, the first access mode is a read-only mode, kernel 120 has write-protected pages of shared memory region 132, and shared memory region 132 is a buffer. At an action 202, application 118 attempts to write to shared memory region 132, which is set to the read-only mode. In an example, application 118 attempts to write to shared memory region 132 via a system call to kernel 120. The attempt to write to shared memory region 132 is in conflict with application 118's access permission to shared memory region 132. Accordingly, a page fault is encountered.

At an action 204, the write trap triggers handler 146 to start a task to drain the buffer. In an example, handler 146 spawns kernel thread 152 to drain the buffer. At an action 206, the write trap triggers handler 146 to change application 118's access permission to shared memory region 132 to a write mode such that application 118 may write to shared memory region 132 without the occurrence of a page fault. Accordingly, if application 118 writes data to shared memory region 132 when it is set to the write mode, a page fault is not encountered. In an example, handler 146 changes application 118's access permission to shared memory region 132 from the read-only mode to the write mode to enable application 118 to write to pages of shared memory region 132 without encountering a page fault.

At an action 208, control of processor 110 is returned to application 118 to continue performing work. Handler 146 may return control to application 118. At an action 210, kernel thread 152 drains the buffer. Actions 208 and 210 may be performed in parallel. At an action 212, kernel thread 152 sends the data stored in shared memory region 132 to the hardware device associated with shared memory region 132.

As discussed above and further emphasized here, FIGS. 1 and 2 are merely examples, which should not unduly limit the scope of the claims. For example, it should be understood that one or more modules may be combined with another module. In an example, kernel interface 144 and handler 146 are combined into one module. It should also be understood that a module may be separated into more than one module. In an example, handler 146 is separated into a first handler module and a second handler module.

Additionally, as discussed above and further emphasized here, the present disclosure may be applied to multiple I/O operations. In another example, video card 116 is associated with shared memory region 132. In such an example, application 118 may write data to shared memory region 132 and the data stored in shared memory region 132 is sent to video card 116, which displays images based on the data on a display coupled to computing device 102.

Moreover, the actions that are performed to accelerate the I/O operations may be transparent to application 118. In another example, application 118 may switch kernel 120 between a first mode and a second mode in relation to marking a memory region as an accelerated region. In such an example, when kernel 120 is in the first mode, kernel 120 is able to mark a memory region as an accelerated region (and perform the actions to accelerate the I/O operations), and when kernel 120 is in the second mode, kernel 120 is unable to mark a memory region as an accelerated region (and does not perform the actions to accelerate the I/O operations). Application 118 may be able to invoke a system call to switch from one mode to the other mode.

IV. Example Method

Figure 3:
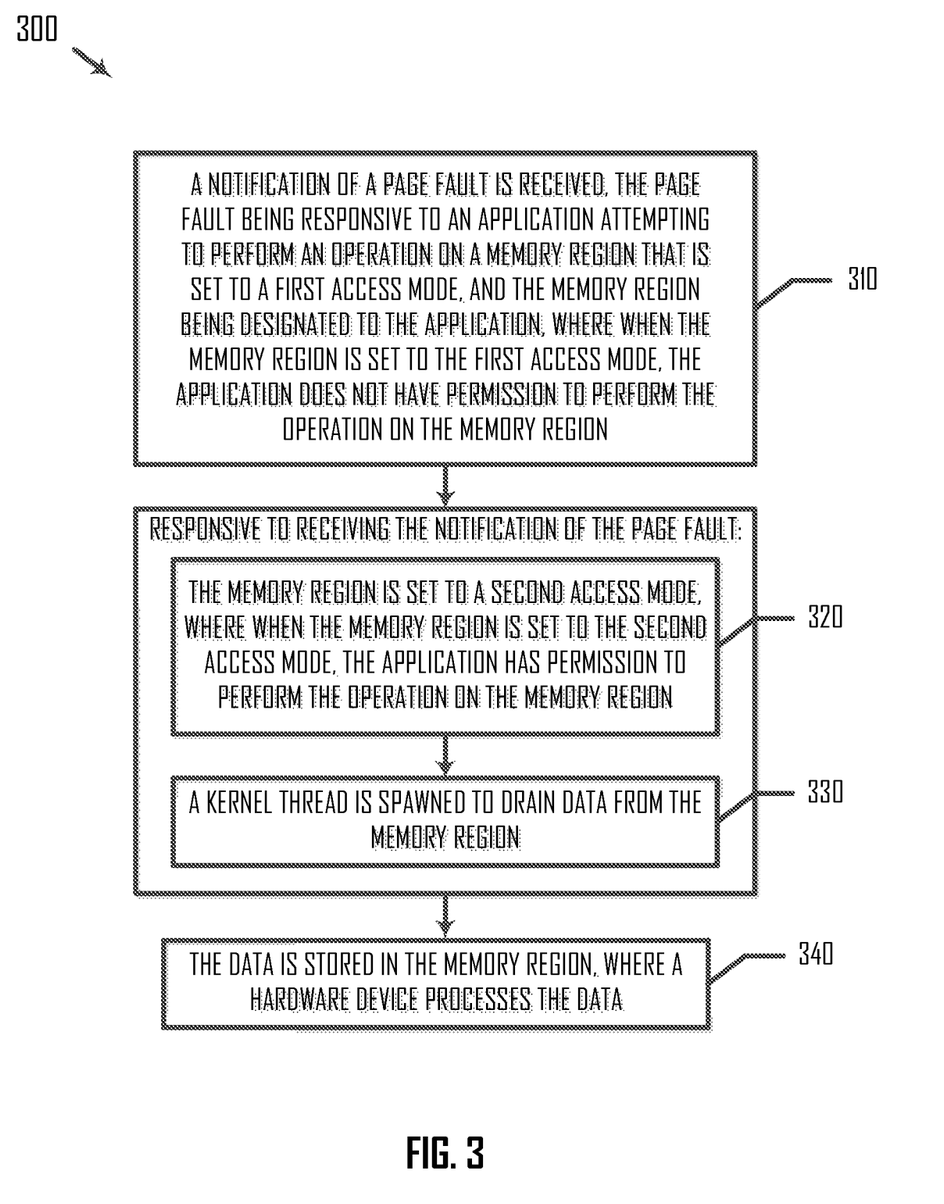
FIG. 3 is a flowchart illustrating a method of processing an I/O operation, according to an embodiment.

FIG. 3 is a simplified flowchart illustrating a method 300 of processing an I/O operation, according to an embodiment. Method 300 is not meant to be limiting and may be used in other applications.

Method 300 includes blocks 310-340. In a block 310, a notification of a page fault is received, the page fault being responsive to an application attempting to perform an operation on a memory region that is set to a first access mode, and the memory region being designated to the application, where when the memory region is set to the first access mode, the application does not have permission to perform the operation on the memory region. In an example, kernel interface 152 receives a notification of a page fault, where the page fault is responsive to application 118 attempting to perform a write operation on shared memory region 132, which is set to a read-only mode. Shared memory region 132 may be designated to application 118.

Responsive to receiving the notification of the page fault, the actions in blocks 320 and 330 may be performed. In a block 320, the memory region is set to a second access mode, where when the memory region is set to the second access mode, the application has permission to perform the operation on the memory region. In an example, handler 156 sets shared memory region 132 to a write mode that enables application 118 to write to shared memory region 132 without the occurrence of a page fault. In such an example, handler 146 may change application 118's access permission to shared memory region 132 from read-only mode to a write mode (e.g., read-write mode, write-execute mode, or write mode). Accordingly, when shared memory region 132 is set to the write mode, application 118 has permission to write to shared memory region 132. In a block 330, a kernel thread is spawned to drain data from the memory region. In an example, handler 156 spawns kernel thread 152 to drain data from shared memory region 132. In an example, application 118 writes data to a set of pages of shared memory region 132 and kernel thread 152 drains the data stored at the set of pages.

In a block 340, the data is stored in the memory region, where a hardware device processes the data. In an example, I/O module 154 stores the data in shared memory region 132, where NIC 114 processes the data and transmits the data over the network. In such an example, application 118 may continue to store other data in pages of shared memory region 132 that are marked as available.

It is also understood that additional processes may be performed before, during, or after blocks 310-340 discussed above. It is also understood that one or more of the blocks of method 300 described herein may be omitted, combined, or performed in a different sequence as desired.

V. Example Computing System

Figure 4:
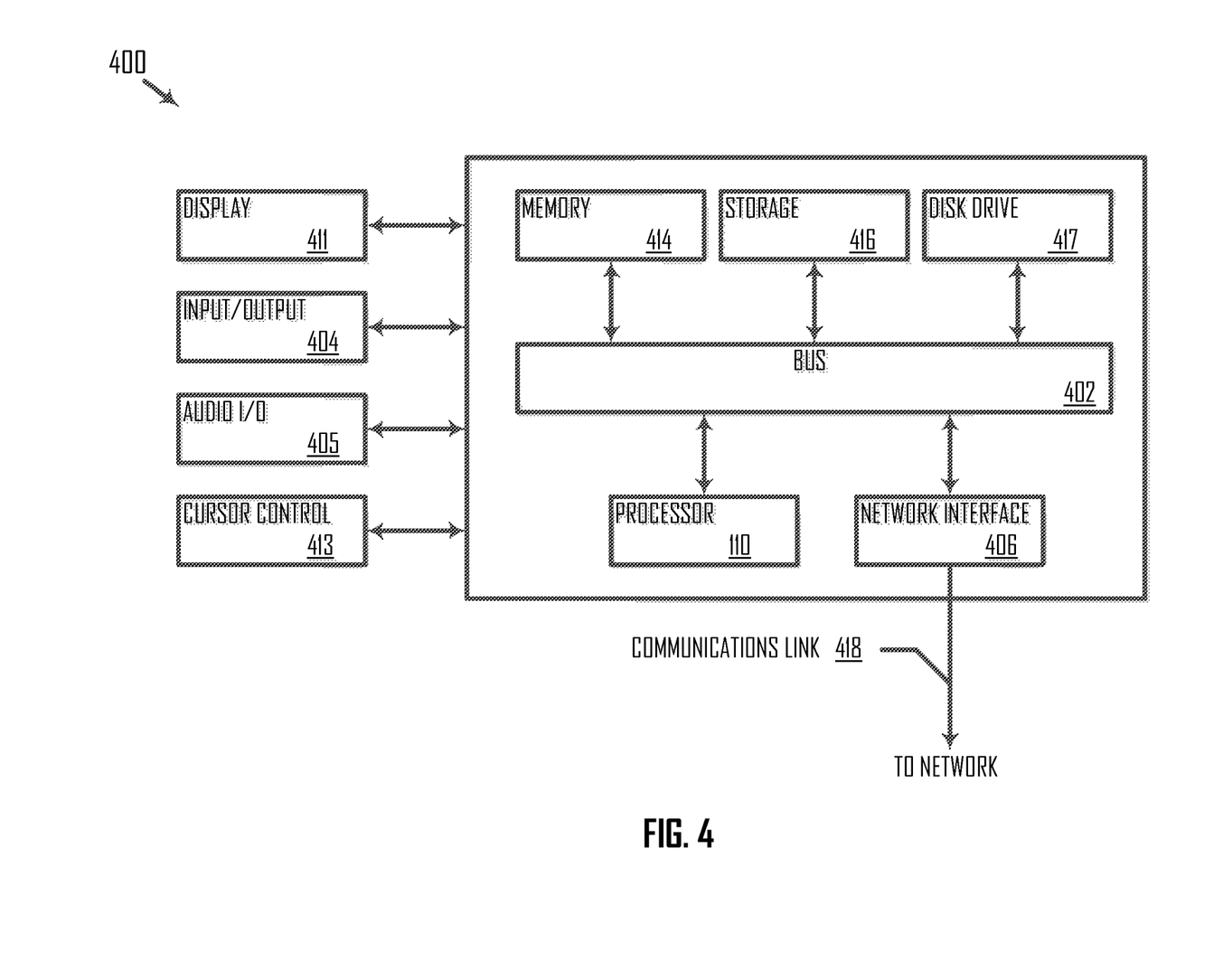
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, computing device 102 may include a client or a server computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). In an example, if shared memory region 132 is associated with video card 116, video card may display objects on display 411.

An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 110, which may be a micro-controller, digital signal processor (DSP), or other processing component, processes these various signals, such as for display on display 411 coupled to computer system 400 or transmission to other devices via communication link 418. Processor 110 may also control transmission of information, such as cookies or IP addresses, to other devices.

Components of computer system 400 also include a system memory component 414 (e.g., RAM), a static storage component 416 (e.g., ROM), and/or a disk drive 417. Memory 108 (see FIG. 1) may include system memory component 414, static storage component 416, and/or disk drive 417.

Computer system 400 performs specific operations by processor 110 and other components by executing one or more sequences of instructions contained in system memory component 414. Logic may be encoded in a computer readable medium, which may refer to any medium that participates in providing instructions to processor 110 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of processing an input/output (I/O) operation, comprising:

receiving a notification of a page fault, the page fault being responsive to an application attempting to perform an operation on a memory region that is set to a first access mode, and the memory region being designated to the application, wherein when the memory region is set to the first access mode, the application does not have permission to perform the operation on the memory region; and responsive to receiving the notification:

setting the memory region to a second access mode, wherein when the memory region is set to the second access mode, the application has permission to perform the operation on the memory region;

spawning a kernel thread to drain data from the memory region; and storing data associated with the operation into the memory region, wherein a hardware device processes the data.

2. The method of claim 1, wherein the operation is a write operation, and wherein during a time period in which the kernel thread is draining the memory region, the application writes second data to the memory region.

3. The method of claim 2, the method further including:

before the time period elapses, returning control of execution to the application.

4. The method of claim 1, wherein the setting includes changing the application's access permission to the memory region from the first access mode to the second access mode.

5. The method of claim 1, further including:

setting the memory region to the first access mode, the first access mode being a read-only mode.

6. The method of claim 5, wherein the setting the memory region to a second access mode includes setting the memory region to a write mode.

7. The method of claim 1, wherein the storing the data includes storing the data in a set of pages of the memory region and marking the set of pages as unavailable.

8. The method of claim 7, further including:

receiving a communication to mark the set of pages as available; and responsive to the communication to mark the set of pages as available, marking the set of pages of the memory region as available.

9. The method of claim 1, wherein the operation is an I/O operation, the method further including:

receiving a notification that the I/O operation has completed;

responsive to the notification that the I/O operation has completed, resetting the memory region to the first access mode.

10. The method of claim 1, wherein the hardware device is a network interface card and the memory region is a network buffer, the method further including:

receiving a request for a region of memory that is dedicated to network operations, the request being from the application and including a descriptor and a memory size;

creating a set of page tables in accordance with the request, the set of page tables including a mapping of the descriptor to the network interface card, and the set of page tables including the application's access permissions to the memory region.

11. A system for processing an input/output (I/O) operation, comprising:

a kernel interface that receives a notification of a page fault, wherein the page fault is responsive to an application attempting to perform an operation on a memory region that is set to a first access mode, and the memory region is designated to the application, wherein when the memory region is set to the first access mode, the application does not have permission to perform the operation on the memory region;

a handler that responsive to the notification (i) sets the memory region to a second access mode and (ii) spawns a kernel thread to drain data from the memory region, wherein when the memory region is set to the second access mode, the application has permission to perform the operation on the memory region; and an I/O module that response to the notification stores the data into the memory region, wherein a hardware device processes the data.

12. The system of claim 11, wherein the operation is a write operation, the memory region includes a first set of pages and a second set of pages, and the I/O module stores the first data in the first set of pages, and wherein during a time period in which the kernel thread is draining the first set of pages, the application writes second data to a second set of pages of the memory region.

13. The system of claim 12, wherein the application is executing in a computing device including a processor, and wherein before the time period elapses, the kernel thread returns control of the processor to the application.

14. The system of claim 11, wherein the first access mode is a read-only mode.

15. The system of claim 11, wherein the application does not invoke a system call to drain the memory region.

16. The system of claim 11, wherein the I/O module stores the data in a set of pages of the memory region, marks the set of pages as unavailable, and receives a communication to mark the set of pages as available, wherein responsive to the communication to mark the set of pages as available, the I/O module marks the set of pages of the memory region as available.

17. The system of claim 11, wherein the operation is an I/O operation, and the I/O module receives a notification that the I/O operation has completed, and wherein responsive to the notification that the I/O operation has completed, the I/O module resets the memory region to the first access mode.

18. A non-transitory machine-readable storage medium comprising a plurality of machine-readable instructions that when executed by one or more processors is adapted to cause the one or more processors to perform a method comprising:

receiving a notification of a page fault, the page fault being responsive to an application attempting to perform an operation on a memory region that is set to a first access mode, and the memory region being designated to the application, wherein when the memory region is set to the first access mode, the application does not have permission to perform the operation on the memory region; and responsive to receiving the notification:

setting the memory region to a second access mode, wherein when the memory region is set to the second access mode, the application has permission to perform the operation on the memory region;

spawning a kernel thread to drain data from the memory region; and storing data associated with the operation into the memory region, wherein a hardware device processes the data.

19. The machine-readable medium of claim 18, wherein the operation is a write operation, and wherein during a time period in which the kernel thread is draining the memory region, the application writes second data to the memory region.

20. The machine-readable medium of claim 19, comprising a second plurality of machine-readable instructions that when executed by one or more processors is adapted to cause the one or more processors to perform a method including:

before the time period elapses, returning control of execution to the application.

\* \* \* \* \*